(12) United States Patent
Pilu et al.

(10) Patent No.: US 9,286,613 B2
(45) Date of Patent: Mar. 15, 2016

(54) ORDERING OF GOODS OR SERVICES USING MEMORY FOR STORING DIGITAL CONTENT

(75) Inventors: Maurizio Pilu, Bristol (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2674 days.

(21) Appl. No.: 11/258,044

(22) Filed: Oct. 26, 2005

(65) Prior Publication Data

US 2006/0095342 A1    May 4, 2006

(30) Foreign Application Priority Data

Oct. 29, 2004 (GB) ................................ 0424150.1

(51) Int. Cl.
*G06Q 30/00* (2012.01)
*G06Q 30/02* (2012.01)
*G06Q 30/06* (2012.01)

(52) U.S. Cl.
CPC ............ *G06Q 30/02* (2013.01); *G06Q 30/0633* (2013.01)

(58) Field of Classification Search
CPC ........................... G06Q 30/02; G06Q 30/0633
USPC ............... 705/26, 27, 26.1, 26.2, 26.25, 26.3, 705/26.35, 26.4, 26.41–26.44, 26.5, 705/26.61–26.64, 26.7, 26.8, 26.81, 26.82, 705/26.9, 27.1, 27.2
See application file for complete search history.

(56) References Cited

U.S. PATENT DOCUMENTS

| | | | |
|---|---|---|---|
| 5,555,297 A | 9/1996 | Ochy et al. | |
| 5,918,213 A | 6/1999 | Bernard et al. | |
| 6,246,326 B1 | 6/2001 | Wiklof et al. | |
| 6,473,739 B1 * | 10/2002 | Showghi et al. | 705/26 |
| 6,512,919 B2 | 1/2003 | Ogasawara | |
| 6,611,673 B1 | 8/2003 | Smith et al. | |
| 7,290,715 B2 * | 11/2007 | Sellen et al. | 235/492 |
| 2002/0147645 A1 * | 10/2002 | Alao et al. | 705/14 |
| 2003/0119447 A1 * | 6/2003 | Fisher et al. | 455/41 |
| 2004/0203944 A1 | 10/2004 | Huomo et al. | |
| 2004/0254843 A1 * | 12/2004 | Koch | 705/26 |
| 2005/0070259 A1 * | 3/2005 | Kloba et al. | 455/414.2 |
| 2005/0178832 A1 | 8/2005 | Higuchi | |
| 2006/0004675 A1 * | 1/2006 | Bennett et al. | 705/402 |
| 2006/0095287 A1 | 5/2006 | Slatter | |
| 2006/0106719 A1 | 5/2006 | McDonnell et al. | |

FOREIGN PATENT DOCUMENTS

| | | |
|---|---|---|
| EP | 1422658 A2 | 5/2004 |
| GB | 2370942 A | 7/2002 |
| JP | 2003022391 | 1/2003 |

(Continued)

OTHER PUBLICATIONS

Gerald L. Lohse et al. "Electronic Shopping", Communications of the ACM, Jul. 1998 / vol. 41, No. 7, pp. 81-88.*
Non-Final Office Action issued on Sep. 22, 2008 for U.S. Appl. No. 11/258,352, Filing Date: Oct. 26, 2005, 19 pages.
Non-Final Office Action issued on Feb. 5, 2009 for U.S. Appl. No. 11/258,096, Filing Date: Oct. 26, 2005, 9 pages.

(Continued)

*Primary Examiner* — Naeem Haq
(74) *Attorney, Agent, or Firm* — Trop, Pruner & Hu, P.C.

(57) ABSTRACT

A memory tag is a transponder device with a memory for storing digital content. The memory contains code for generating an order for goods or services from a plurality of order choices.

1 Claim, 10 Drawing Sheets

(56) References Cited

FOREIGN PATENT DOCUMENTS

| | | |
|---|---|---|
| JP | 2003316871 | 11/2003 |
| JP | 2004030147 | 1/2004 |
| JP | 2004272344 | 9/2004 |

OTHER PUBLICATIONS

Non-Final Office Action issued on Jul. 23, 2009, for U.S. Appl. No. 11/258,352, Filing Date: Oct. 26, 2005, 34 pages.
Final Office Action issued on Jul. 27, 2009, for U.S. Appl. No. 11/258,096, Filing Date: Oct. 26, 2005, 8 pages.

* cited by examiner

ORDERING OF GOODS OR SERVICES USING MEMORY FOR STORING DIGITAL CONTENT

FIELD OF THE INVENTION

The invention relates to ordering of goods or services using memory for storing digital content. More specifically, the invention relates to a digital pro forma stored in a memory of a memory tag and to its creation, distribution and use.

BACKGROUND OF THE INVENTION

For small businesses, orders are typically made by mail, by telephone or by customers physically at the small business premises. Some small businesses are able to accept orders electronically, but this is generally an unsatisfactory mechanism in most areas of commerce as it requires either technical competence or considerable investment by the business, and also appropriate and available hardware for the user. Some mechanisms for ordering by cellular telephone are known (for example, a mechanism for ordering from a vending machine by cellular telephone with billing addressed by the service provider), but these typically require considerable infrastructure and cost for the supplying business.

Ordering by telephone is the most attractive route for customers for many forms of goods (for example, takeaway food). It would be desirable to improve current approaches to ordering goods and services by telephone to improve the ordering experience for the user while enabling cost effective order processing by the business.

SUMMARY OF THE INVENTION

In one aspect, the invention provides a memory tag being a transponder device with a memory for storing digital content, the memory containing code for generating an order for goods or services from a plurality of order choices.

DESCRIPTION OF THE DRAWINGS

Specific embodiments of the invention will now be described, by way of example, with reference to the accompanying drawings, of which.

DESCRIPTION OF SPECIFIC EMBODIMENTS

Figure 1:
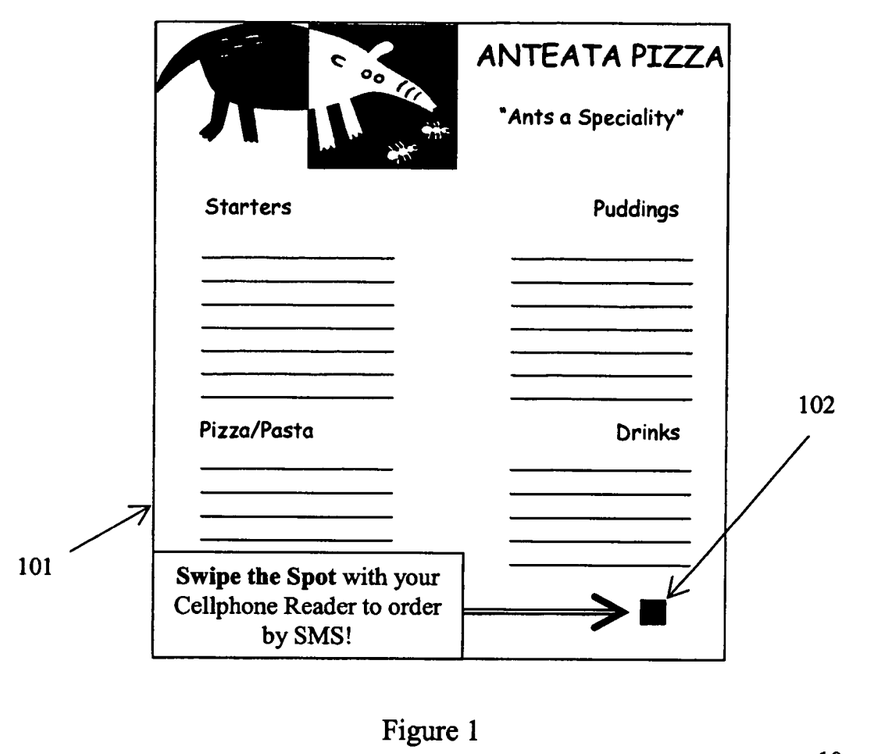
FIG. 1 shows a document according to an embodiment of the invention.

FIG. 1 shows a document according to embodiments of the invention. The document in this case is a takeaway menu for a pizza restaurant. The menu 101 contains a memory tag 102 containing a pro forma order. Use of such a menu for the making of customer orders will be described in detail below.

A suitable memory tag will first be described, together with discussion of how a document can be created containing such a memory tag. A context for creation and use of a document such as that shown in FIG. 1 will then be described, as will its use in order generation and fulfilment. Updating of the document will be considered, as will the use of alternative form factors to the document of FIG. 1.

A memory tag may be generally considered as a transponder device with significant memory—sufficient to store significant digital content rather than just identifier data—and an exemplary device of this kind is described below. The type of memory tag discussed here is designed to be read by a suitable reader device at close range and to provide rapid data transmission—data can thus be read by "brushing" the reader device across the memory tag.

The schematics of a suitable memory tag will be described in FIG. 2. Circuitry for such a tag and for a suitable reader will be described in FIG. 3. A printer device suitable for printing the document of FIG. 1 bearing a memory tag of the form described with reference to FIGS. 1 and 2 will be shown in FIG. 4. The memory tag described below is adapted so that data can be not only read from it by the reader, but also so that data can be written to it. This is relevant to some, though not to all, embodiments of the invention.

Figure 2:
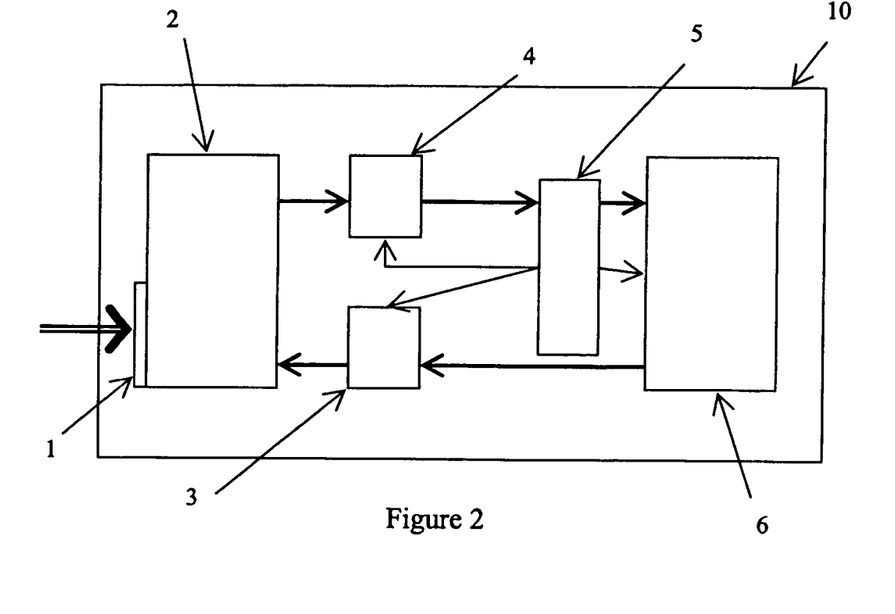
FIG. 2 shows schematically the elements of a memory tag suitable for use in embodiments of the invention.

The elements of an RFID-like memory tag 10 are shown in FIG. 2. Such a tag is inductively powered by an RF signal received from a reader, and is also read by and (in relevant embodiments) written to by such a reader (strictly, reader/writer) device. The memory tag contains an antenna 1 to receive signal from the reader device and transponder circuitry 2 to extract power from the received signal to power the memory tag and to receive data from a read data circuit 3 to allow data to be provided from the tag memory 6 by varying a resonant circuit of the transponder circuitry 2. A write data circuit 4 is provided to detect data to be written to the tag memory 6 and also for control data to be provided to the memory tag—detected data is provided to control logic 5. Control logic 5 is provided to control the operations of the memory tag in response to the signals received from the reader device.

Depending on the nature of the memory tag, control logic 5 can vary very considerably in complexity. For a tag which, once manufactured, can only be read and not written to, control logic 5 need not exist—the tag may be adapted simply so that when it is powered up, it simply transmits its content from beginning to end repeatedly until it is no longer powered. Any greater level of complexity requires some logic—for example, a read-only tag may initially return only a first set of data, but would be responsive to a specific signal from the reader to return a second set of data instead (for example, from a list of choices provided in the first set of data). Similarly, a tag which can be both read and written to requires sufficient control logic such that the reader can prepare the tag to receive data for writing to the tag memory and to stop such writing (for example, by providing an "end of data" signal or by specifying the number of bits of data to be written in advance). Where more complex operation is required from the memory tag, control logic 5 may be a suitable processor.

Figure 3:
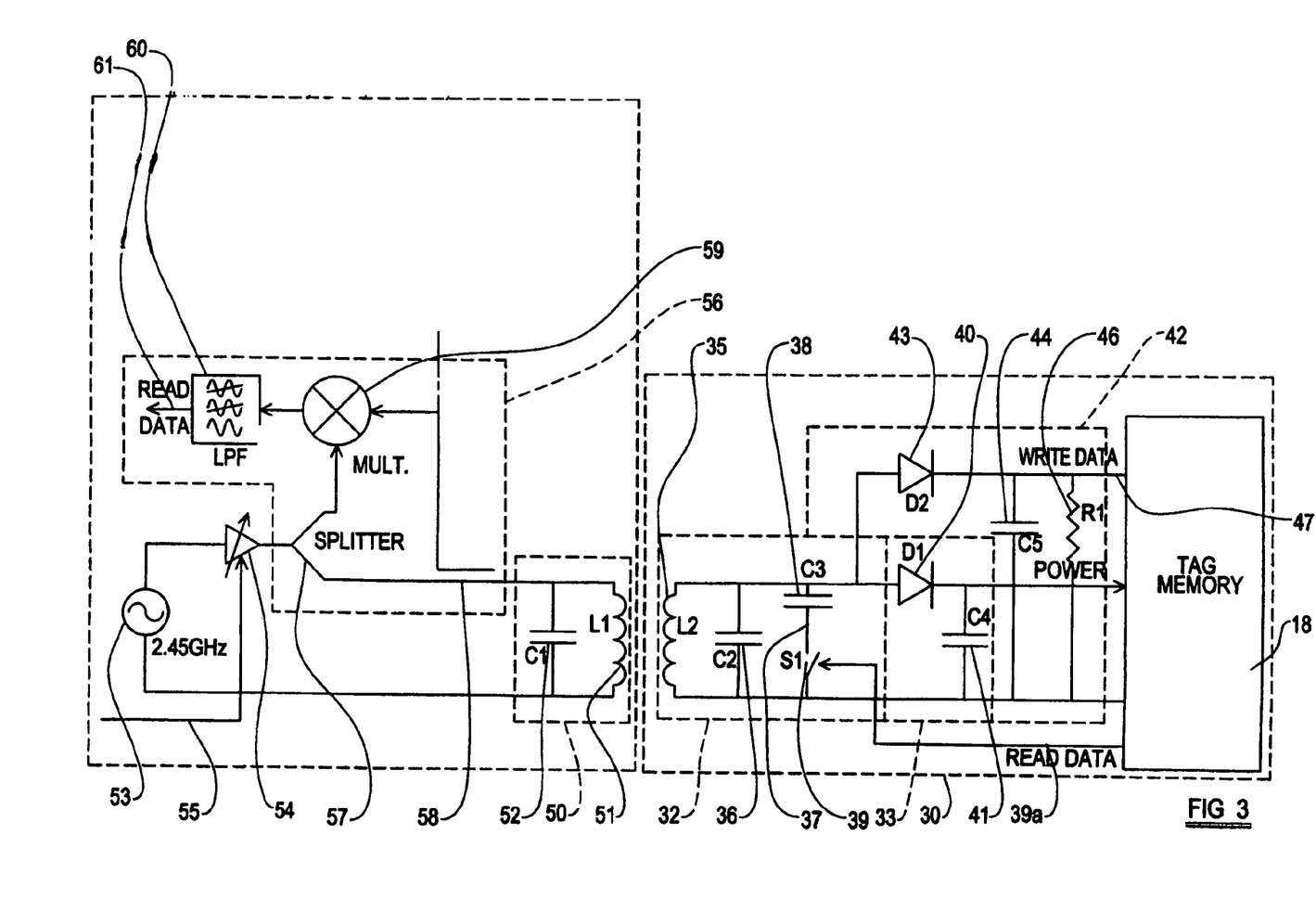
FIG. 3 shows circuitry for the memory tag of FIG. 2 and for a suitable reader device.

FIG. 3 shows an exemplary memory tag 30, though without indicating control circuitry (which may for these purposes be considered as part of the tag memory block 18), together with a reader (or reader/writer) device 31. The tag 30 comprises a resonant circuit part 32 and a rectifying circuit part 33, together with a memory 18. The resonant circuit part 32 comprises an inductor L2 35 and a capacitor C2 36 connected in parallel The resonant circuit part 32 further comprises a controllable capacitive element generally indicated at 37, in the example of FIG. 3 comprising a capacitor C3 38 and a switch S1 39 which is connected to a read data line 39a connected to the memory 36 to modulate the resonant frequency of the resonant circuit part 32. The rectifying part 33 comprises a diode D1 40 connected to the resonant circuit part 32 in a forward biased direction and a capacitor C4 41 connected in parallel with the components of the resonant circuit part 32. The rectifying circuit part 33 operates as a half-wave rectifier to provide power to the memory 18. The tag 30 further comprises a write data circuit part 42. The write data circuit part 42 comprises a diode D2 43 connected in the forward bias direction to the output of the resonant circuit part 32, with a capacitor C5 44 and a resistor R1 46 connected in parallel with the components of the resonant circuit part 32. The write data circuit part 42 in this case comprises a simple envelope detector which is responsive to the magnitude of the signal generated by the resonant circuit part 32, and provides a write data signal on a line 47 to the memory 18. For these purposes such "write data" may include control data, and control logic is considered as lying within the element denoted as memory 18.

The read/write device 31 in like manner to the detector 23 comprises a resonant circuit part 50 which comprises an inductor L1 51 and a capacitor C1 54 connected in parallel. A frequency generator 53 is connected to the resonant circuit part 50. The read/write device 31 further comprises an amplitude modulator 54 which is controllable in response to data sent on a write data line 55. The amplitude modulator 54 controls the power of the signal from the frequency generator 53 to the resonant circuit part 50, and thus provides modulation of the amplitude of the power of the signal generated by the resonant circuit part 32 which can be detected by the write data circuit part 42 of the tag 30.

The read/write device 31 further comprises a demodulator, generally shown at 56. The demodulator 46 comprises a splitter 57 connected to the frequency generator 45 to split off a part of the signal to provide a reference signal. A coupler 58 is provided to split off a part of the reflected signal reflected back from the resonant circuit part 50. The reference signal and reflected signal are passed to a multiplier indicated at 59. The multiplier 59 multiplies the reflected signal and the reference signal and passes the output to a low pass filter 60. The low pass filter 60 passes a signal corresponding to the phase difference between the reference signal and the reflected signal to an output 61. By controlling the switch S1 39 of the tag 30 under control of the memory 34, the resonant frequency of resonant circuit part 32 can be modulated and hence the phase of the reflected signal reflected by the resonant circuit part 50 with respect to a reference signal can be modulated. This change of phase is detected by the demodulator 55, and so data can be read from the tag by the read/write device 31. By this method, data may be transmitted from the tag 30 whilst not significantly affecting the power drawn by the resonant circuit part 32.

Figure 4:
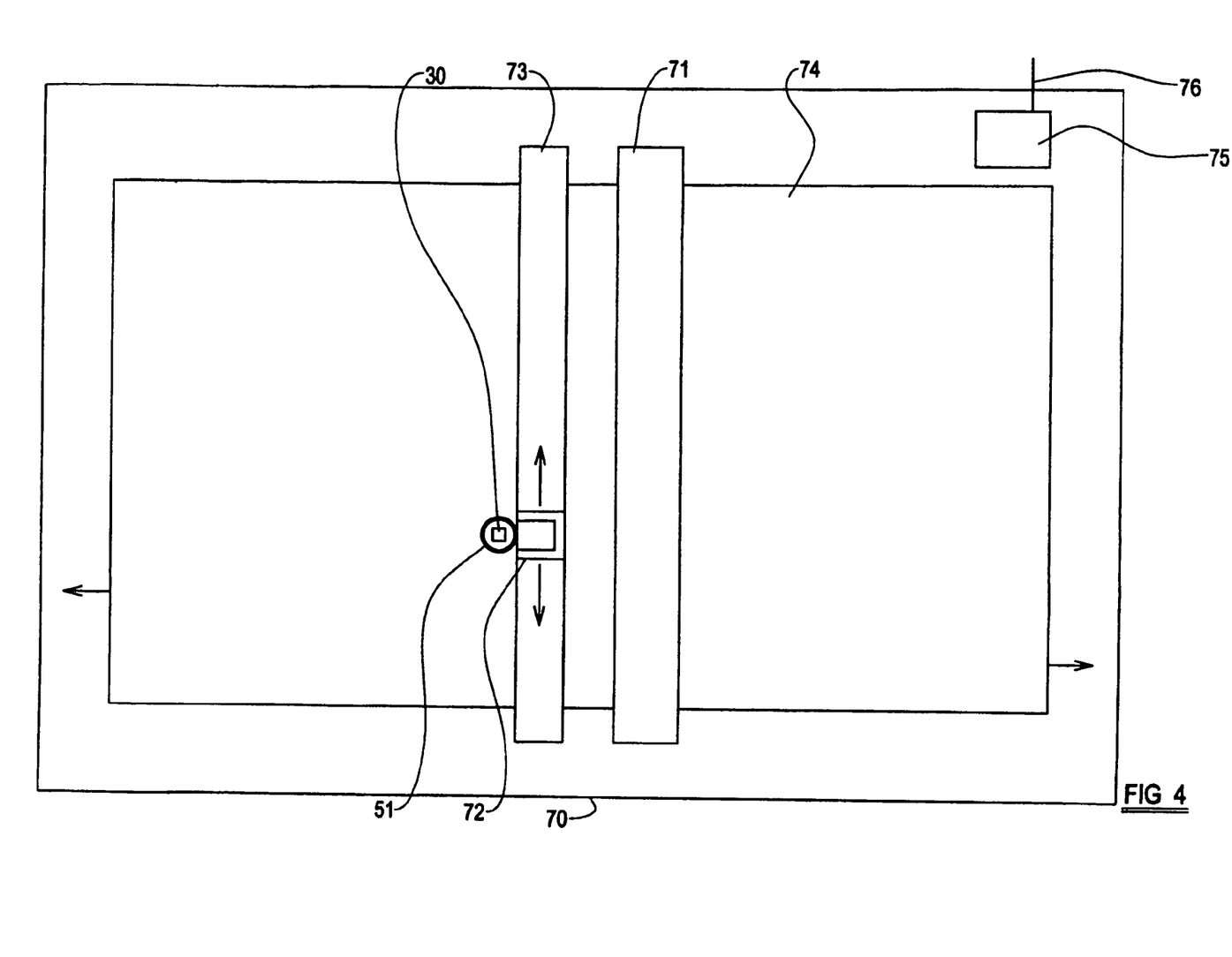
FIG. 4 shows a design for a printer suitable for printing the document of FIG. 1 containing a memory tag as shown in FIGS. 2 and 3 according to an embodiment of the invention.

A printer suitable for printing the document of FIG. 1 including the memory tag of FIGS. 2 and 3 is shown in FIG. 4. Printer 70 is provided with means to handle and print on a base medium—in this case, a roller shown diagrammatically at 71 and a print head 72 movable on a track 73. The printer 70 is operable to receive a suitable flexible base medium, in this example a sheet of paper 74, provided with a tag 30 adhered to or formed on the paper 74. In this example, the print head 72 is provided with a read/write device 31, and the inductor 51 comprises a loop antenna projecting from the print head 72. The printer comprises a printer controller 75 provided with an external connection 76, for example to a computer to receive data to be printed. The printer controller 75 is operable to control the rollers 71 to feed the paper sheet 74, and also to move the print head 72 along the track 73 and instruct the print head 72 to print on the paper 34.

In this embodiment, the printer controller 75 will be aware of the position of the paper sheet 74 by virtue of operation of the roller assembly 71 and also knows the position of the print head 72 on the track 73. The printer controller may also know the position of the memory tag 30 on the paper (if the paper is of a specified type) or may be able to discover its position—appropriate technology for this is discussed in the applicants' EP-A-1431903. Data to be written to the document can be provided by a computing device (not shown) to the printer controller 75—the print job may for example be accompanied by a transmission of data to be written to the memory tag associated with that print job. The skilled person will appreciate that this, and also the writing of multiple memory tags for a single print job, can be achieved by ordinary skill in the art.

Documents may of course also be produced by separately writing to and affixing the memory tag 30 before or after the printing of the document.

Figure 5:
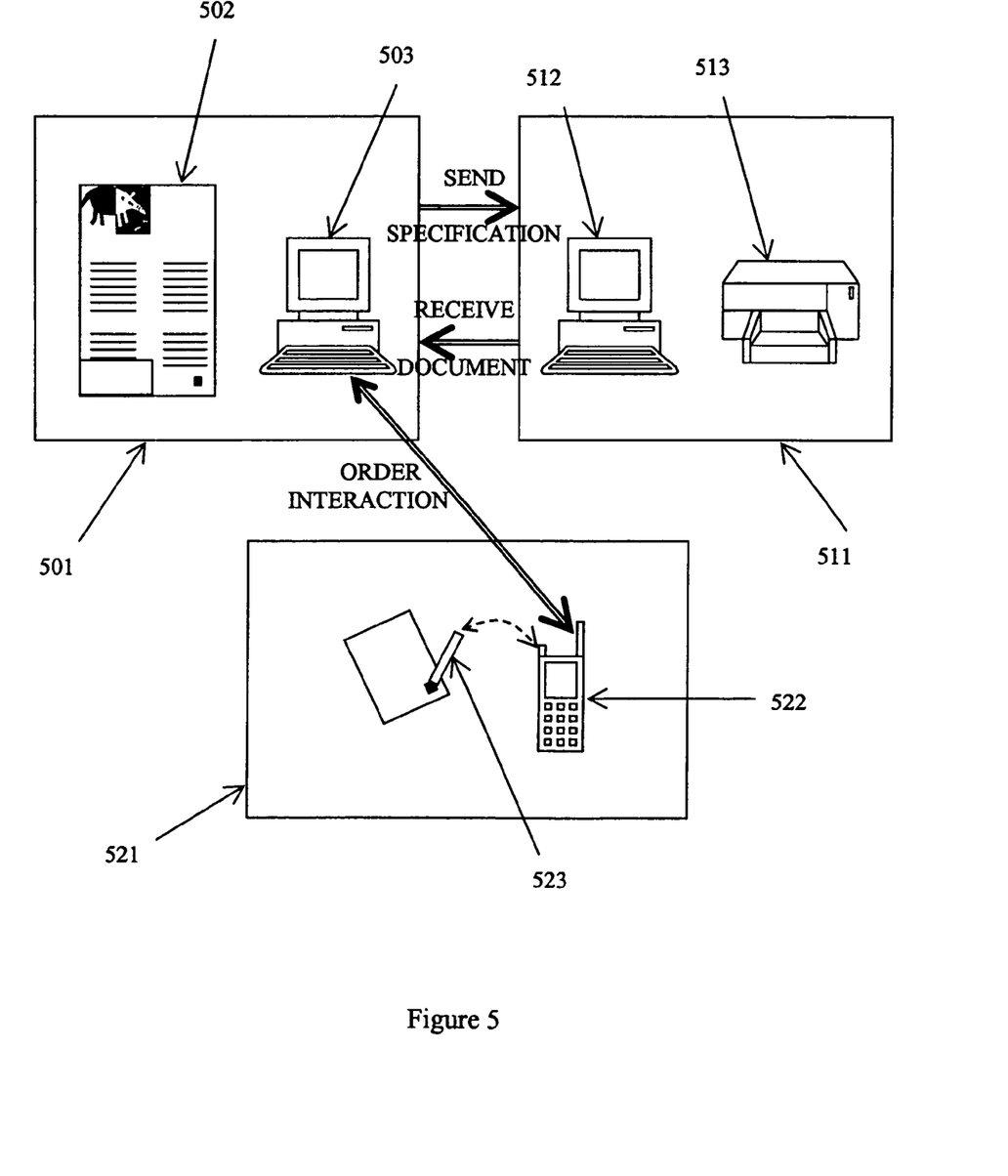
FIG. 5 shows the different parties involved in generating and using the document shown in FIG. 1 and their relevant physical resources.

Examples of the use of a document such as that shown in FIG. 1 with the memory tag of FIGS. 2 and 3 will be discussed below. For the purpose of these examples, a particular set of parties involved in generating and using the document will be considered. These parties and their relevant physical resources are depicted in FIG. 5.

A business 501 provides a service or goods and specifies its offer in a document 502. The document 502 may not be produced by the business itself, but by a document provider 511 when advised of the specification of the offer by the business. Document 502 contains both a physical and a digital part—in this case, both are prepared by the document provider 511 through computer 512 and printer 513, but in principle, both parts may be provided by separate providers, or one or both parts may in fact be produced directly by the business 501. Customers 521 of the business receive the document 502 by an appropriate distribution method (discussed below) and then read the digital part of the document 502 and communicate with the business by appropriate communication means—in the examples discussed below, this is achieved by use of cellular telephones 522, though any other computing means with access to an appropriate communications network could in different arrangements be used, together with memory tag reader devices 523. Communication is made with a computer 503 at the business to place the order and enable the business to fulfil it.

Figure 6:
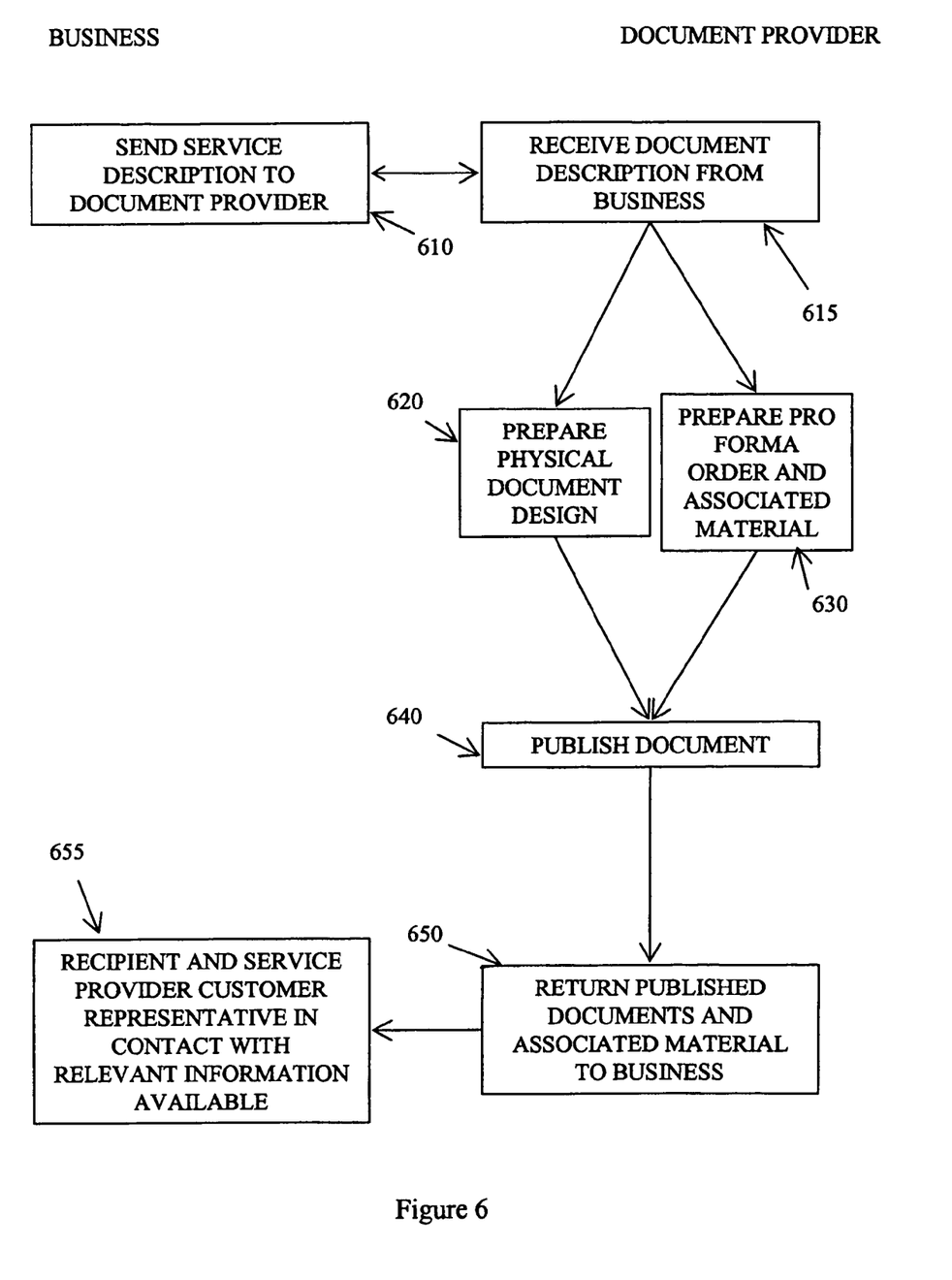
FIG. 6 illustrates the steps involved in creation of a document as shown in FIG. 1 according to an embodiment of the invention.

FIG. 6 shows the steps involved in generation of the document 502. In the case illustrated, document 502 is a takeaway menu, but could equally well be a catalogue or other document from which a recipient would place an order (as discussed further below, in embodiments of the invention alternatives to documents are discussed). This specific example assumes that the business 501 is only capable of providing a specification of services, but as will be discussed below, some or all of the role of the document provider 511 may be provided by a business 501 with suitable competence.

A service specification is first provided 610 by the business to (615) the document provider. The nature of this service specification depends on how much is to be achieved in the ordering process, and how much is to be achieved at service delivery. Payment is a significant issue. Payment considerations can be kept entirely separate from the service specification—this may be appropriate where there will be a direct interaction between business and customer on fulfilment of the order (for example, by collecting takeaway food from the premises of the business) as payment can be handled in conventional manner at this time. The service specification may thus contain only options to allow any appropriate order from the services provided by the business. Alternatively, it may contain pricing information so that the customer can see the cost of the order before placing it. In a further alternative, the specification may comprise use of a payment mechanism appropriate to the communication route used to place an order.

The processing of the order specification by the document provider contains two separate paths. In one path 620, the physical document design is prepared—this is a matter of conventional graphic design and may or may not involve interaction with and approval by the business to produce an acceptable physical document design. In the other path 630, the electronic pro forma order is prepared. This procedure involves rendering the specification in the form of a list or hierarchy of choices to allow valid orders and order combinations to be selected by a customer and confirmed as an order. Where appropriate, this may also include pricing information to allow an order cost to be assessed by the customer. Also required is a method for generating a message from a confirmed order for sending to the business to allow the order to be placed with, if required, a protocol for subsequent communication to allow orders and prices to be confirmed and (if appropriate) payment made. In addition to this, a method of recognising order messages at the business needs to be developed so that these can be appropriately processed and (if appropriate) acknowledged. Further details of these requirements will be made in the subsequent discussion of the order process.

Once the electronic pro forma is prepared and the physical document design settled, the document can be published 640. This can be achieved by pre-preparing document stock with memory tags loaded with the pro forma order data or code, by printing the document and affixing memory tags afterwards, or by printing the document and writing to a blank memory tag in the document stock at the same time using a printer as shown in FIG. 4. In the example discussed here, the pro forma order is not personalised to the recipient so the memory tags can contain identical content (so each document 502 is the same, both physically and in digital content). By providing customer data to the document provider, it would also be possible to have one or both of the physical content and the digital content of the document personalised to an individual recipient—this may be useful in some contexts (where simplification of ordering for the recipient and personalised service are significant) but less so in others (where minimising cost to the business is significant).

Documents are then returned 650 to (655) the business for distribution (some or all may of course be distributed by the document provider or by another service provider in a mail shot, for example)—the business will also receive software to allow it to recognise and process incoming orders as discussed above (and below).

It can be appreciated that in this way completely different order specifications can be provided in accordance with the needs of different businesses without requiring technical sophistication on the part of the businesses themselves. As can be seen further below, there need also be no requirement for technical sophistication in order handling and processing.

Documents are distributed to customers by any appropriate means—examples may be: mail shots, response to information requests; inclusion in newspapers, magazines or other media; and display at the premises of the business or other commercial premises. The use of the document by a customer to order from the business will now be discussed with reference to FIG. 7.

Figure 7:
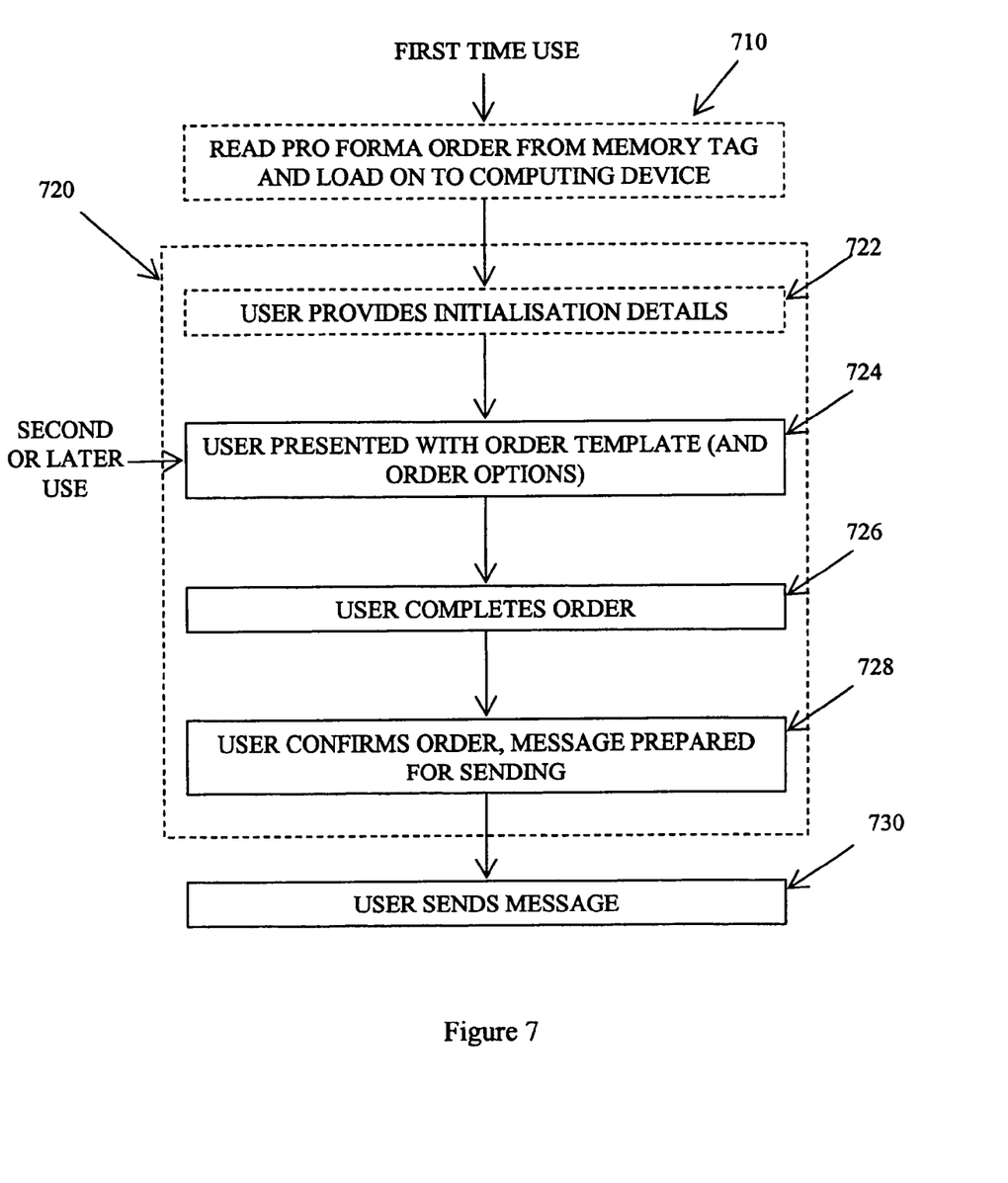
FIG. 7 illustrates the steps involved in use of the document shown in FIG. 1 to prepare and send an order for goods or services from a provider according to an embodiment of the invention.

The customer decides, on the basis of information in document 502 or otherwise, to make an order from the business. The first step in an initial order is to user reader device 523 to read 710 the pro forma order information from the memory tag on the document 502 into the customer's cellular telephone (or other computing and communications device). This step may not need to be carried out in future orders if the pro forma order information can be stored on the cellular telephone.

There are many possible alternatives to a cellular telephone as a user's computing and communications device in this context. One attractive possibility is use of a PDA or handheld computer with communications capability (for example a modem). This may have advantages in certain contexts through having greater computational power. Another possibility is a music player (MP3 or otherwise) with communications capability—this may be an appropriate form factor for making orders relating to digitally provided music.

The pro forma order is provided in the form of code to allow an order to be generated. Code may generally be considered as data for generation of a result, and may for example cover on the one hand a passive data format and on the other hand executable code. A simplest form of code may be a passive data format containing plain text for insertion into a conventional SMS text editor for review, editing and dispatch by the user, together with a destination address for the message to be sent to. In a greater level of complexity, the code may be structured according to defined fields such that some fields require user completion and such that others (for example credit card details, if used, and telephone and delivery address of the user) are entered automatically from profile data in the telephone.

Figure 8:
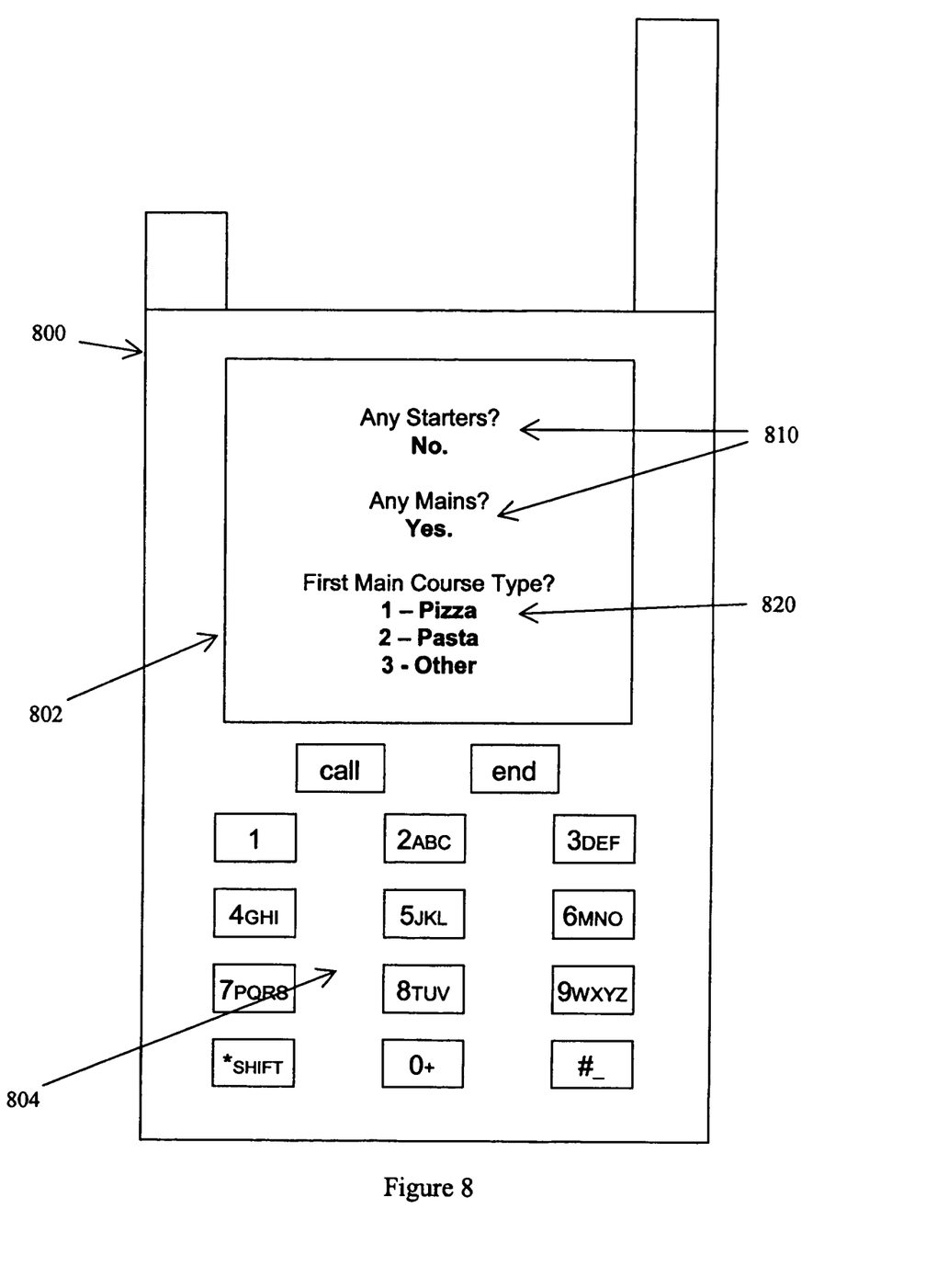
FIG. 8 illustrates a user interface of a cellular telephone in the process of use for ordering goods or services from a provider as shown in FIG. 7.

Executable code may be in any appropriate form—it may for example be provided as a Java applet, or as a means to generate an XML document. On execution of the code (shown generally as 720), the user is offered choices to allow the order to be completed. The first time that the code is run, the user may be requested 722 to provide various initialisation details (name, cellular telephone number—possibly payment information)—alternatively some or all of these may be obtained from personal profile information held in the cellular telephone. The user will then be presented 724 with an order template—there may also be provided standard orders (for example, popular order choices at a special price) and if this is not the first use of the code, there may also be provided previous orders made by the customer. This stage will be the starting point for second and later uses of the pro forma order—the code will have already been loaded on to the cellular telephone and initialisation details provided. The user then completes an order 726, for example by selecting from a list of choices or by answering a series of questions—an illustration of such a process is shown in FIG. 8, which shows previous questions and answers 810 scrolling up towards the top of a display screen 802 of a cellular telephone 800 while a further question with response options 820 is provided for user response using the keypad 804 (or other user interface) of the cellular telephone 800. On completion of the order, the user confirms that it is ready to send and a message is generated 728. The messaging protocol used may be determined to be appropriate to the requirements of the order process (e-mail may be used if the ordering process is complex, or if payment is required—SMS may be used if the order can be provided in a limited number of characters). In the present example, payment is not made as part of the ordering process and the order choices can be simply encoded into a message short enough for transmission by SMS. SMS is an attractive protocol for this purpose as it has low cost and minimal latency, allowing orders to be placed and acknowledged very rapidly. The user sends the message 730 in the same manner as a normal SMS message—the ordering code provides the business address for dispatch of the SMS message.

As indicated above, alternatives to SMS may be used. A particularly attractive alternative in some contexts to SMS is MMS. One context in which MMS would be strongly preferable is where data provided by the user is not limited to simple text. An example may be ordering of T-shirts or other clothing with user-selected graphics or images. The data for insertion into the order by a user may here include an image for printing on to the T-shirt. In this case, SMS would not be a satisfactory messaging medium but MMS may be a particularly suitable choice. The skilled person will appreciate that other messaging systems may also be employed if suitable for the demands of this application.

The above discussion does not include payment with the order. In many cases, this is best handled at order fulfilment (as in the present example of takeaway food, where payment at collection of the food may be the most satisfactory solution) but could be provided with the order or as a part of the confirmation of the order. Where payment is made with the order, some level of security will be required (as there are obvious risks to the user if, for example, credit card details are sent in clear by e-mail or SMS)—this may be handled by known secure payment methods, but this does add complexity to the interaction. An alternative approach is for an agreed transaction to be billed through the user's telephone account with appropriate payment being made by the telephone service provider to the business—this allows for immediate payment with easier management of security risks, again however with some additional operational complexity.

Figure 9:
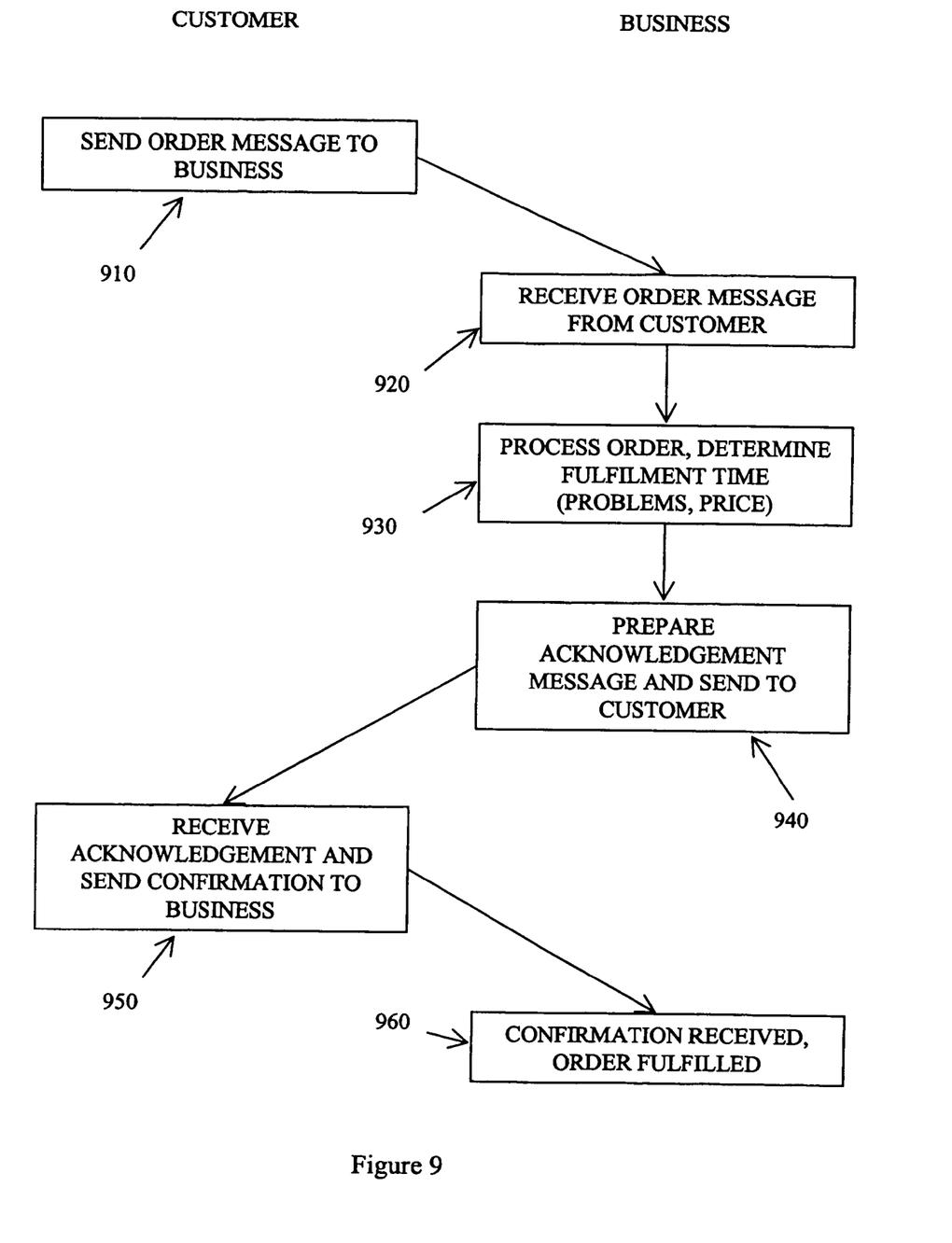
FIG. 9 shows schematically messaging interactions from the sending of an order by the user to execution of the order.

Regardless of whether payment is made at the time of order, it will be desirable to have confirmation of the order by the business. A suggested approach is shown in FIG. 9. Once the message is sent 910 by the customer to the business, it is received 920 and processed 930 (as is discussed further below with reference to FIG. 10) to determine whether there are any difficulties with fulfilment, or if not, to provide a fulfilment time (this may be, for example, a predicted time or a guaranteed time, depending on the business model of the business). An acknowledgement of the order is then prepared and sent 940 to the customer, indicating (typically) the order details, the fulfilment time and the price, and requesting confirmation of the acknowledgement. The user then sends 950 confirmation of the acknowledgement and the business fulfils 960 the order. Communication steps 940 and 950 are very effectively carried out by SMS, as this has low latency and the customer reply message can effectively be produced with (typically) two or three key presses only. In a variant approach, acknowledgement 940 may provide a payment request and confirmation 950 may include payment by an appropriate mechanism as discussed above.

It will be appreciated that variation to this ordering process is possible. If the completed order is complex (for example, if it is or would generally be too large to be sent by SMS or MMS, and other protocols such as e-mail are used), then it may be advantageous not to order immediately but to wait until the user is in the proximity of a WiFi hotspot and can make a high bandwidth connection. The order (and, if used, acknowledgement and confirmation) approach may then be initiated as soon as a WiFi connection is established.

Figure 10:
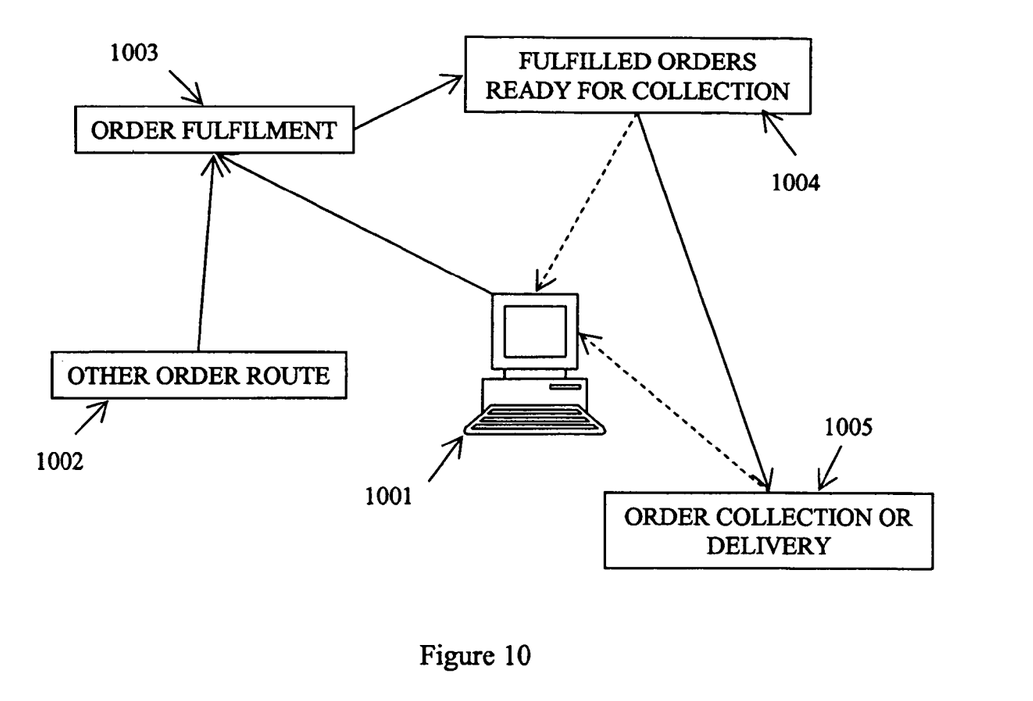
FIG. 10 illustrates handling of an order at the business from receipt to fulfilment.

Processes at the business are illustrated in FIG. 10. Computing apparatus 1001 is used to receive orders and confirmations and to send acknowledgements, and also to provide the order details for fulfilment. In the exemplary case of a restaurant, this may involve confirmed orders being printed out for inclusion in a physical queue (such as a stack of orders on a spike) or messaged for inclusion in a queue at a computer in the kitchens—in either case, orders received by the pro forma order mechanism will typically need to be integrated with orders received by other means 1002 (by telephone conversation, or made by customers physically present at the business) into an order fulfilment queue 1003. Computing apparatus 1001 needs to be adapted to receive messages over the communication route used by the customer—this may require that the computing apparatus is adapted to receive SMS messages (this may be achieved trivially if the computing apparatus has access to a cellular telephony network, and can be achieved in known manner if the computing apparatus has access only to the relevant wired telephony network). The computing apparatus 1001 will need to run the software (received, in this example, from the document provider) to allow it to recognise an incoming message as an order submitted using the pro forma mechanism. Such messages would typically be coded (not primarily for security, but to ensure that the messages are not confused with other incoming messages and to enable the full range of orders to be provided in a short message—this is particularly significant where SMS is used). By running the software on each incoming message of the appropriate type, the computing apparatus will be able to recognise that the incoming message is an order, interpret the order and (depending on design) either notify the attending business operative that an acknowledgement should be sent or else produce an acknowledgement directly. When confirmation of the acknowledgement is then recognised and received, the order may be passed on for fulfilment. Fulfilled orders are then made ready 1004 for collection or delivery 1005 to the customer—the pro forma order support software running on computer 1001 is advantageously updated when an order is ready for collection/delivery and further updated when collection/delivery (and if appropriate payment) occurs.

Figure 11:
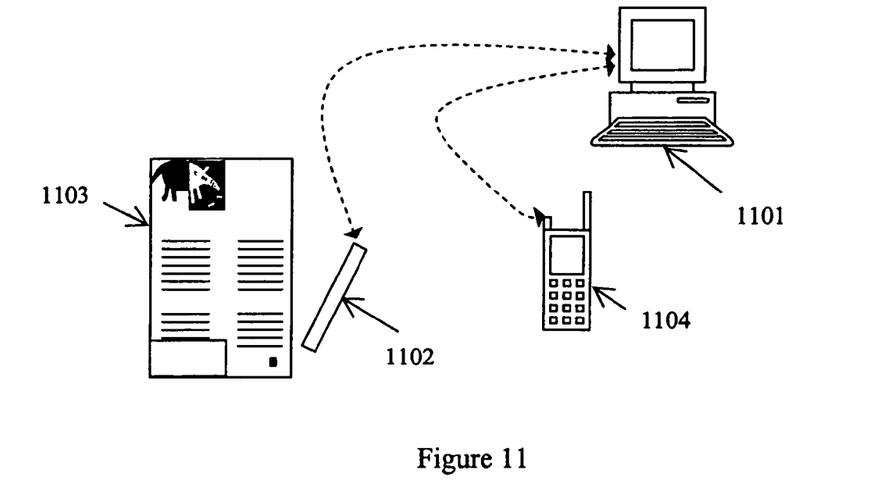
FIG. 11 shows a process for updating electronic information in a document as shown in FIG. 1.

In the example shown here, the customer collects the fulfilled order from the business and makes payment at that time (though payment may be made at an earlier point as discussed above). A mechanism may also be provided for updating (by replacement or addition) the pro forma order. A customer may be alerted to the need or opportunity to update (the order may include an indication of the version of the pro forma update, making it straightforward to diagnose this and provide an appropriate acknowledgement—if such updates are provided it may be desirable for more than one version of the pro forma order to be valid for use at any given time). While an update may be possible over the cellular telephony network, it may be more desirable to achieve this over a cheap or free high bandwidth connection at the business. The update could be made directly from business computer 1101 to user cellular telephone 1104 by a short-range wireless networking protocol such as Bluetooth. Other approaches are possible—the update could be provided as a memory tag on a business counter, for example, and the customer could just read this with a memory tag reader on to the cellular telephone in exactly the same manner as the pro forma reader was originally read from the document. The memory tag physical document 1103 could also be updated by using a memory tag reader/writer 1102—this will only be possible if the memory tag in the physical document can be written to (and is thus not read-only).

Figure 12:
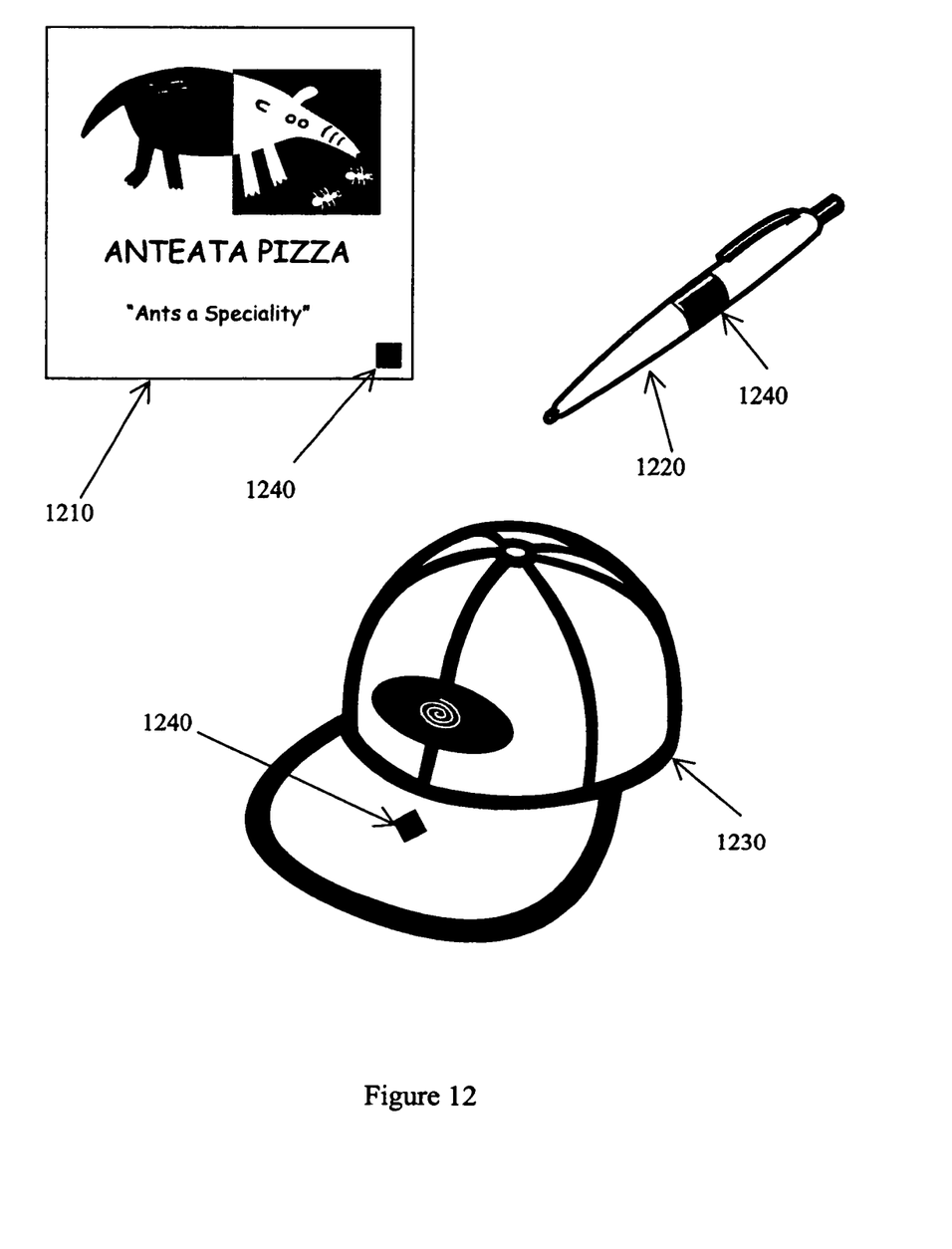
FIG. 12 shows some alternative form factors for embodiments of the invention alternative to that shown in FIG. 1.

It may not be logical to update a paper document such as a menu with a new pro forma order—the more logical approach would simply be to obtain a new paper document. However, it can be appreciated that in place of a document, essentially any artefact capable of having a memory tag incorporated within it can be used. Possible form factors are shown in FIG. 12—these include fridge magnet 1210, baseball cap 1220 and pen 1230, each equipped with their own memory tag 1240. Where the item is of significant value, updating may be a more attractive option than replacement.

It will also be appreciated that the item bearing the pro forma order may not be in control of the user. The document may be a catalogue in a store, or may be a promotional display in the store itself or in some other public context (such as a mall or cinema foyer). All that is required is for the user to be legitimately able to approach sufficiently close to the object bearing the memory tag for the memory tag to be read by the user.

While the present discussion indicates various embodiments of the invention, the skilled person will appreciate that further embodiments can be determined from the principles indicated above. In this connection, use of a memory tag for providing information relating to the progression of a transaction between a customer and a service provider is discussed further in the applicant's copending application of even date entitled "Interaction Between Service Providers And Customers", the contents of which are incorporated by reference herein.

The embodiments above discuss the use of a cellular telephone of the customer for communication with the business. The skilled person will appreciate that in place of a cellular telephone, any communications device with appropriate computing capability—or combination of computing device and communications device interacting together—may be employed. Embodiments of the invention may therefore employ any of a desktop PC, a laptop PCs, and a PDA, for example. The communications device may use the wired telephony infrastructure rather than a cellular telephony infrastructure.

The invention claimed is:

1. A method of creating orders for goods or services, comprising:
    a business providing code for generating an order for goods or services from a plurality of order choices in a memory tag being a transponder device with a memory for storing digital content;
    a user uploading the code from the memory tag to a handheld computing device, the code including at least executable code for generating an order on the handheld computing device in the form of digital data thereon;
    providing the user with an order template on the handheld computing device, the order template for the user to place an order on the handheld computing device even when the user is out of range of the memory tag and initiate the order as soon as a connection is established;
    the user sending the order generated using the uploaded code on the handheld computing device from the handheld computing device to the business; and
    updating a pro forma order on the memory tag.

\* \* \* \* \*